United States Patent [19]

van der Lely et al.

[11] 4,049,061
[45] Sept. 20, 1977

[54] ROTARY HARROWS

[75] Inventors: Ary van der Lely, Maasland; Cornelis Johannes Gerardus Bom, Rozenburg, both of Netherlands

[73] Assignee: C. van der Lely N. V., Maasland, Netherlands

[21] Appl. No.: 602,467

[22] Filed: Aug. 6, 1975

[30] Foreign Application Priority Data

Aug. 6, 1974 Netherlands ............................ 7410530

[51] Int. Cl.² ............................................. A01B 33/06
[52] U.S. Cl. ........................................ 172/49; 111/13; 111/66; 172/68; 172/79; 172/619
[58] Field of Search ................. 172/59.49, 68, 76, 79, 172/468, 625, 619, 624, 613, 674, 677, 307, 462, 657, 484, 699, 78; 111/13, 66

[56] References Cited

U.S. PATENT DOCUMENTS

| 1,369,431 | 2/1921 | Hicks | 172/78 X |
|---|---|---|---|
| 1,486,016 | 3/1924 | Hain | 172/677 |
| 1,747,753 | 2/1930 | Burkhart | 172/468 |
| 1,872,121 | 8/1932 | Christensen | 172/625 X |
| 2,280,846 | 4/1942 | Pitcher | 172/79 |
| 2,658,770 | 11/1953 | Koenig | 172/625 X |
| 2,830,517 | 4/1958 | Keyes | 172/79 X |
| 2,979,136 | 4/1961 | Oehler et al. | 172/625 X |
| 3,094,172 | 6/1963 | Ose et al. | 172/625 X |
| 3,240,005 | 3/1966 | Rowse | 172/625 X |
| 3,534,817 | 10/1970 | Garis et al. | 172/484 X |
| 3,810,434 | 5/1974 | van der Lely et al. | 172/59 X |
| 3,885,633 | 5/1975 | van der Lely et al. | 172/68 |

Primary Examiner—Paul E. Shapiro
Attorney, Agent, or Firm—Mason, Mason & Albright

[57] ABSTRACT

A cultivating implement or rotary harrow has two groups of soil working members mounted on upwardly extending shafts that extend transverse to the direction of operative travel. The groups of soil working members are adjustably linked to an elongated frame of the harrow and the front of the longer side of the frame has a coupling member for connection to the rear of a prime mover for soil working operation. One of the shorter sides has a second coupling member that can be coupled to the prime mover during transport. Pairs of ground wheels at the front and rear of the frame are employed to support the harrow both in operative and in transport positions. Each group of soil working members has a supporting rear roller and arms that extend from the front of the frame over the roller to support a tool bar to which seed drills, for instance, can be connected.

5 Claims, 5 Drawing Figures

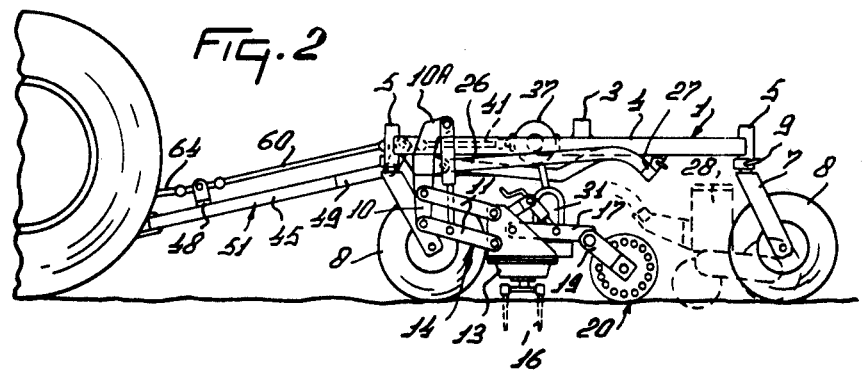

ROTARY HARROWS

Figure 1:
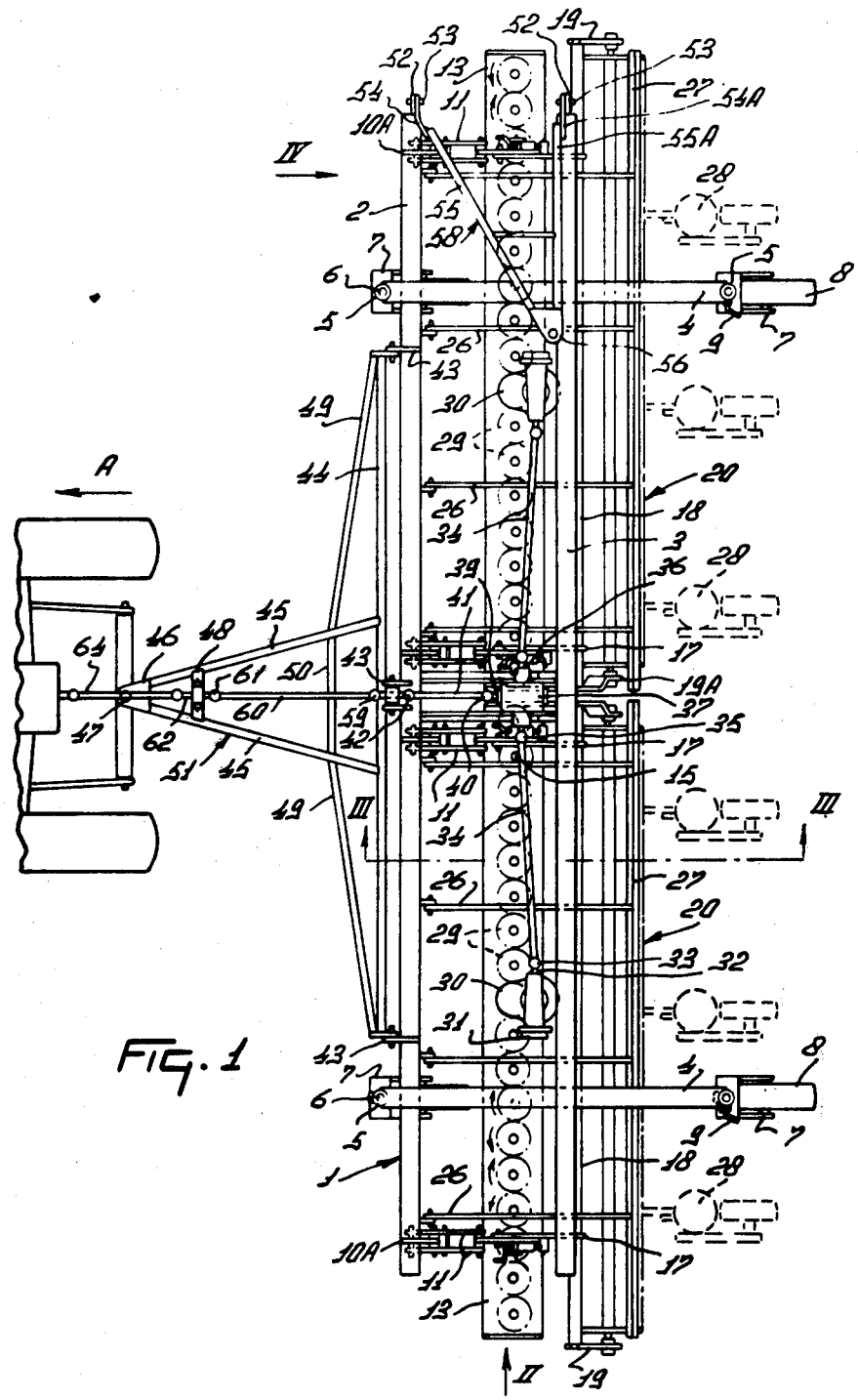
Figure 5:
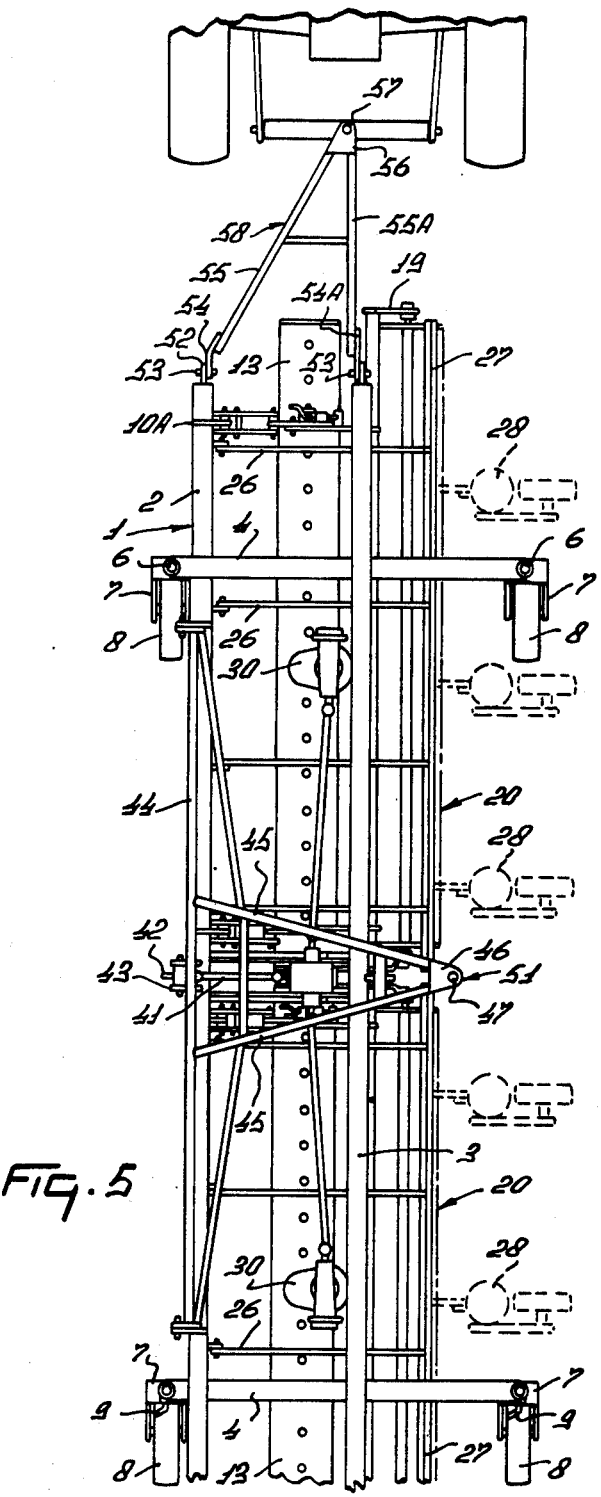

For a better understanding of the invention, and to show how the same may be carried into effect, reference will now be made, by way of example, to the accompanying drawings, in which:

FIG. 1 is a plan view of a rotary harrow in accordance with the invention disposed in a working position and connected to the rear of an agricultural tractor, FIG. 2 is a side elevation as seen in the direction indicated by an arrow II in FIG. 1, FIG. 3 is a section, to an enlarged scale, taken on the line III—III in FIG. 1, FIG. 4 is a front elevation, to the same scale as FIG. 3, as seen in the direction indicated by an arrow IV in FIG. 1, and FIG. 5 is a plan view illustrating the harrow disposed in a position suitable for inoperative transport and connected to the rear of an agricultural tractor.

Referring to the drawings, the soil cultivating implement or rotary harrow is illustrated will hereinafter be referred to, throughout the remainder of the descriptive portion of this specification, merely as a "rotary harrow" for the sake of brevity. The rotary harrow comprises a generally oblong supporting structure or frame 1 which includes two frame beams 2 and 3 that extend substantially horizontally parallel to one another in spaced apart relationship in a direction that is transverse, and normally substantially perpendicular, to the intended direction of operative travel of the harrow which is indicated by an arrow A in FIG. 1 of the drawings. The leading frame beam 2 with respect to the direction A is located at a lower horizontal level than is the rear frame beam 3, said frame beams 2 and 3 being hollow and of substantially square cross-section (see FIG. 3). The frame beams 2 and 3 are interconnected by two tie beams 4 that both extend substantially parallel to the direction A, the two tie beams 4 being disposed at equal distances from the opposite ends of the beams 2 and 3. The tie beams 4 are secured to the tops of the leading frame beams 2 and to the bottoms of the rear frame beams 3 and it will be evident from the drawings that said tie beams 4 project short distances forwardly of the leading frame beam 2 with respect to the direction A and larger distances rearwardly, with respect to the same direction, beyond the frame beam 3, the latter distances being not less than substantially equal to the distance in the direction A between the two parallel frame beams 2 and 3. Substantially vertical sleeves 5 are rigidly secured to the front and rear ends of the two tie beams 4 and four corresponding substantially vertical shafts 6 are turnably mounted in the four sleeves 5. The lowermost ends of the shafts 6 that project beneath the bottoms of the sleeves 5 are secured to the bases of corresponding forks 7. It can be seen in FIGS. 2 and 3 of the drawings that the limbs of each fork 7 extend obliquely downwardly from the base thereof towards the ground surface. Ground wheels 8 are rotatably mounted between the limbs of the forks 7 by axles 7A that perpendicularly interconnect said limbs close to the lowermost free ends thereof. The axes of rotation of the ground wheels 8 that are embodied in the axles 7A do not intersect the longitudinal axes of the corresponding shafts 6 because of the oblique disposition of the limbs of the forks 7 and, accordingly, the ground wheels 8 are castor ground wheels that are swivellable about the axes of the corresponding shafts 6. However, each of the two ground wheels 8 that is at the rear of the rotary harrow with respect to the direction A can have its plane of rotation retained in at least two different angular settings about the axis of the corresponding shaft 6 by employing a corresponding locking pin 9 that is located at the lower end of the corresponding sleeve 5. the two angular settings of the planes of rotation of the ground wheels 8 about the axes of the corresponding shafts 6 are substantially 90° removed from one another around those axes as will be seen from a comparison of FIGS. 1 and 5 of the drawings, said settings thus corresponding to the working and inoperative transport positions of the rotary harrow respectively. The mounting of a third one of the four ground wheels 8 is similarly provided with one of the locking pins 9 but that locking pin is operable only to fix the plane of rotation of the ground wheel 8 concerned in the setting required for inoperative transport of the harrow. Said third ground wheel 8 is the one located at or near the bottom left-hand corner of the harrow as seen in the plane view of FIG. 1 or FIG. 5 of the drawings.

Four upright supports 10 are rigidly secured to the leading frame beam 2 of the structure of frame 1 at equal distances from the midpoint of that frame beam and at short but equal distances from the opposite free ends of said beam. The leading ends of two pairs of arms 11 are pivotally connected to each support 10 in vertically spaced apart relationship at locations beneath the frame beam 2. The two arms 11 of each pair are located at opposite sides of the corresponding support 10 (see FIG. 4) and the rear ends of each assembly of four arms 11 are pivotally connected to the front, with respect to the direction A, of a corresponding generally triangular plate 12. FIG. 3 of the drawings shows that each plate 12 is of generally right-angled triangular configuration and that the pivotal connections of the arms 11 thereto are disposed close to the leading substantially vertically edges of the plates 12. Two of the four plates 12 have their lower edges rigidly secured to the top of one hollow box-shaped frame portion 13 and the other two plates 12 are substantially symmetrically identically secured to the top of a second hollow box-shaped frame portion 13. The arms 11 form parts of dual parallelogram linkages that are generally indicated by the reference 14 which linkages are so constructed and arranged that each frame portion 13 can move upwardly and downwardly relative to the supporting structure or frame 1, substantially without tilting, independently of the other frame portion 13. The two frame portions 13 are normally in substantially horizontal alignment in a direction that is substantially perpendicular to the direction A and the two ends thereof that are located in a central region of the hallow are in closely neighbouring relationship.

Each frame portion 13 supports a corresponding group of 18 rotatable soil-working members 16 that are arranged in a corresponding single row. Each soil-working member 16 is mounted at the lowermost end of a corresponding upwardly extending and normally vertical or substantially vertical shaft 15 that is rotatably journalled in the frame portion 13 concerned. The axes of rotation of the shafts 15 of each group are spaced apart from one another at regular intervals by distances which should not be greater than substantially 30 centimeters and which it is preferred should have magnitudes of substantially 25 centimeters. Each soil-working member 16 comprises a substantially horizontal support whose midpoint is rigidly secured to the lowermost end of the shaft 15 concerned. The opposite ends of the support carry substantially vertically disposed holders, which may be of sleeve-like configuration, and said holders receive the fastening portions of downwardly extending soil tillage tools that may conviently, as illustrated, be in the form of rigid tines. The two tines or other tools of each soil-working member 16 are disposed at diametrically opposite sides if the corresponding axis of rotation and their lowermost free ends or tips are spaced apart from one another by a distance which is little greater than is the distance between the axes of rotation of immediately neighbouring shafts 15. Thus, during the operation of the harrow, the strips of land that are worked by the individual members 16 will overlap one another to produce a single broad strip of worked soil. This overlapping disposition also applies to the end members 16 of the two groups that are located at the center of the path of travel of the harrow, when the latter occupies its working position, and the harrow is thus able to work a single very broad strip of land having a width of substantially 9 meters when the preferred spacing of substantially 25 centimeters between the longitudinal axes of immediately neighbouring shafts 15 is employed. The total working width is at least twice the working width of one group of the soil working members 16 that corresponds to one of the frame portions 13.

Each of the upright substantially triangular plates 12 has the leading end, with respect to the direction A, of an arm 17 pivotally connected to it, said arm 17 extending rearwardly, with respect to the direction A, from its pivotal coupling to the plate 12 concerned. The rear ends of the two arms 17 that correspond to each frame portion 13 are fastened to a corresponding tubular support 18 that normally extends substantially horizontally perpendicular to the direction A. The opposite free ends of the two tubular supports 18 carry corresponding downwardly and rearwardly, with respect to the direction A, inclined supporting arms 19 and 19A, the arms 19 being at the relatively remote ends of the two supports 18 and the arms 19A being at the very closely neighbouring ends of those supports that are located substantially centrally across the width of the harrow. Each pair of supporting arms 19/19A holds a corresponding rotatable supporting member in the form of an open ground roller 20. Each roller 20 comprises a plurality, such as sixteen, of elongated longitudinally extending elements 21 that are arranged around the skeletal right circular cylindrically curved surface of that roller in parallel or substantially parallel relationship with the axis of rotation of the roller. Each roller 20 extends throughout substantially the whole of the working width of a corresponding one of the two groups of soil-working members 16 and is thus in substantial register with the corresponding frame portion 13 at the rear of that frame portion with respect to the direction A. Each plate 12 is provided, near the top thereof, with an upwardly and rearwardly inclined arm and the free end of that arm is pivotally connected by a corresponding adjuster to a location substantially midway along the length of the corresponding arm 17. The adjusters are in the form of screw-threaded spindle assemblies 22 that are variable manually by rotating crank handles at their upper ends. Such assemblies 22 are known per se and do not require detailed description in this specification. It will, however, be evident from the drawings that each assembly 22 is obliquely inclined to the vertical and to the direction A and that operating it in known manner to increase or decrease its effective length will turn the corresponding arm 17 either upwardly or downwardly about the pivotal connection of that arm to the corresponding plate 12, thus raising or lowering the level of the axis of rotation of the roller 20 concerned relative to the corresponding frame portion 13 so that, during operation, the tines or other tools of the corresponding soil-working members 16 will be able to penetrate into the soil to a greater or leaser extent.

The top of each upright support 10 is formed with a rearwardly bent over portion 10A and the cylinder of a corresponding hydraulic piston and cylinder assembly 23 is pivotally connected to the extremity of the portion 10A. When the harrow is in operation, the cylinders of the four assemblies 23 are coupled by flexible hydraulic ducts (not shown) to the hydraulic system of the agricultural tractor or other vehicle which moves and operates the harrow. It can be seen from the drawings that retraction of the piston rods of the assemblies 23 into their cylinders will move the frame portions 13 and the rollers 20 upwardly to a sufficient extent to bring the soil-working members 16 and the rollers 20 free of contact with the ground. Lugs 24 that project rearwardly with respect to the direction A are secured to the leading beam 2 of the supporting structure of frame 1 at substantially regular intervals between the two upright supports 10 that are furthes remote from one another. Substantially horizontal pivot pins 25 connect the leading ends of arms 26 to said lugs 24, the arms 26, which are substantially regularly speced apart from one another across the width of the harrow, first extending substantially rectilinearly away from the pins 25 but subsequently being formed with curved portions whose convex sides are upwardly directed, said curved portions being included in the rear halves of the arms 26. The rear ends of the curved portions of the arms 26 are directed downwardly and each set of arms 26 that is in vertical register with one of the two frame portions 13 carries, at the extreme rear ends of those arms, a corresponding substantially horizontally disposed tool bar 27 which is normally substantially perpendicular to the direction A and parallel to the beam 2 and 3. The two tool bars 27 allow co-operating agricultural tools or implements to be connected to the harrow for substantially simultaneous use therewith. Such tools or implements could be seen drills, potato or other tuber planters, fertiliser distributors, planting machines and the like and, for illustrative purposes, the accompanying drawings show six precision seed drills 28 in broken lines, three of them connected to one of the tool bars 27 and the other three connected to the companion tool bar 27.

Each of the shafts 15 is provided, inside the corresponding hollow box-shaped frame portion 13, with a straight-toothed or spur-toothed pinion 29, said pinions 29 being so arranged that, in each frame portion 13, the teeth of each pinion 29 are in mesh with the teeth of its neighbour, or of both of its neighbours, in the row thereof. The result is that the pinions 29 and the corresponding soil-working members 16 will rotate in the alternately opposite directions that are indicated by small arrows in FIG. 1 of the drawings when the harrow is in use. One of the center pair of shafts 15 that corresponds to each group of soil-working members 16 has an upward extension into a corresponding gear box 30 that is fastened to the top of the frame portion 13 concerned. Each shaft extension is provided, inside the corresponding gear box 30, with a pinion whose teeth are in mesh with those of a further pinion carried by a shaft that is parallel to said extension but located rearwardly thereof with respect to the direction A. The upper end of this second shaft carries a bevel pinion whose teeth are in driven mesh with those of a further bevel pinion that is carried by a shaft which extends substantially horizontally parallel to the transverse length of the frame portion 13 concerned. One end of the substantially horizontal shaft, which is not visible in the drawings, and one end of an overlying and parallel substantially horizontal shaft 32 both project through a wall of the gear box 30 concerned into a corresponding change-speed gear 11. The transmission ratio between the two substantially horizontal shafts that correspond to each gear box 30 can be chosen, as may be required, by employing a corresponding pair of straight-toothed or spur-toothed exchangeable and/or interchangeable pinions on the splined ends of the two shafts that are located in the corresponding change-speed gear 31. This facility enables the speed of rotation of the soil-working members 16 to be increased or decreased to match the nature and condition of the soil that is to be cultivated and the degree of fineness of that soil that is required after treatment without having to alter the speed or rotation of the drive source for the soil-working members 16. Each change-speed gear 31 comprises a removable sealing cover arranged to prevent the chosen pair of co-operating pinions and their lubricant from becoming contaminated by dirt. It will be apparent from FIG. 1 of the drawings and from the description above that the two gear boxes 30 and change-speed gears 31 are substantially symmetrically identical.

One end of each upper substantially horizontal shaft 32 projects from the corresponding gear box 30 in a direction towards the center of the harrow and is there connected by a universal joint 33 to one end of a corresponding telescopic transmission shaft 34. The opposite end of each telescopic transmission shaft 34 is connected by a further universal joint 35 to a corresponding end of a substantially horizontal shaft 36 that is rotatably journalled in a central gear box 37 of the harrow which is supported by the structure of frame 1 thereof. As can be seen in the drawings, the two telescopic transmission shaft 34 both extend substantially, but not strictly parallel to the transverse lengths of the corresponding frame portions 13. The central gear box 37 is, in fact, connected to the supporting structure or frame 1 by supports 38 (FIG. 3) which interconnect the beams 2 and 3 in a direction substantially parallel to the direction A at locations close to the midpoints of those beams 2 and 3. The single shaft 36 whose opposite ends project from the sides of the central gear box 37 is connected by bevel pinions disposed inside that gear box to a rotary input shaft 39 of the gear which has a splinded or otherwise keyed end that projects substantially horizontally forward from the front thereof with respect to the direction A. The single shaft 36 could, if preferred, by replaced by two separate but axially aligned shafts. In the working position of the harrow which is illustrated in FIGS. 1 to 4 of the drawings, the splined or otherwise keyed end of the rotary input shaft 39 of the central gear box 37 is connected by a universal joint 40 to one end of a transmission shaft 41 whose opposite end, in turn, is connected by a further universal joint to one end of a short shaft 42. The short shaft 42 is rotatably mounted in a bearing block that is pivotally connected by trunnion pins to the upper ends of upwardly and forwardly inclined supporting lugs 43 whose lower ends are rigidly secured to the top and front of the beam 2.

Two more of the lugs 43 are carried by the beam 2 at locations close to the rigid connections of the tie beams 4 to that beam. The opposite ends of a beam 44 that extends substantially horizontally parallel to the beam 2 are turnably connected to the last mentioned two supporting lugs 43 by short arms and substantially horizontally aligned pivot pins. The beam 44 extends throughout at least half of the transverse length of the supporting structure or frame 1 and, at equal distances from the opposite sides of its midpoint, it is secured to the ends of two forwardly convergent (in the position of FIGS. 1 to 4 of the drawings) beams 45. The leading ends of the two beams 45 are fixed to one another by a coupling member 46. The coupling member 46 comprises a towing eye 47 or the like. The two rearwardly divergent beams 45 are interconnected, at a distance behind the coupling member 46, by a sustaining member 48. The opposite ends of the beam 44 are rigidly connected to the two arms 45 by forwardly convergent stuts 49 whose connections to the two beams 45 are also directly linked to one another by a transverse member 50 that is substantially parallel to the beam 44, the struts 49 and member 50 conviently being integrally formed. The assembly which comprises the beam 44, the V-relationship beams 45, the sustaining member 48, the struts 49, the transverse member 50 and the coupling member 46 affords a drawbar which is generally indicated by the reference 51, said drawbar 51 being part of coupling means of the harrow that is located at one of the longer sides of the generally oblong supporting structure or frame 1 and by which coupling means the harrow can be connected to an agricultural tractor or other vehicle for operative travel over the ground in the direction A.

Each of the two beams 2 and 3 of the supporting structure of frame 1 is provided, at the same end, with an upwardly inclined lug 52 (FIGS. 1, 4 and 5) and further lugs 54 and 54A are turnably connected to the two lugs 52 by pivot pins 53 that are substantially horizontally aligned in a direction parallel to the direction A. As can be seen in the drawings, the lug 54 is bent over while the lug 54A is straight, said lugs 54 and 54A being connected to the ends of corresponding arms 55 and 55A. The arms 55 and 55A are convergent in a direction away from the lugs 54 and 54A and their junction ends are fixed together by a coupling member 56 that is formed with a towing eye 57 or the like. The arms 55 and 55A, a transverse member which interconnects them and the coupling member 56 together afford a drawbar which is generally indicated by the reference 58, said drawbar 58 forming part of coupling means at one of the shorter sides or ends of the generally oblong supporting structure or frame 1 and being usable in the inoperative transport of the harrow. The oblique dispositions of the lugs 52 and of the co-operating lugs 54 and 54A are such that, when the drawbar 58 is in use (FIG. 5), the arm 55A is substantially axially in line with the rear (with respect to the A — FIG. 1) beam 53.

The short rotary shaft 42 that is supported by a bearing block between the two central lugs 43 has its leading end with respect to the direction A connected by a universal joint 59 to the rear end of a transmission shaft 60 whose leading end, in turn, is connected by a further universal joint 61 to the rear end of a second short shaft 62 that is rotatably carried by a bearing block pivotally mounted by trunnion pins between upright lugs disposed on top of the sustaining member 48 that is part of the drawbar 51. The front end of the second short shaft 62 is arranged to be placed in driven connection with the power take-off shaft of the towing and operating tractor or other vehicle through the intermediary of a telescopic transmission shaft 64 that is of a construction that is known per se having universal joints at its opposite ends.

In the use of the rotary harrow that has been described, the towing eye 47 or the like of the drawbar 51 is pivotally connected by a hitch pin or the like to a tow bar at the rear of the operating agricultural tractor or other vehicle. The rear power take-off shaft of the same tractor or other vehicle is placed in driving connection with the thirty-six soil-working members 16 by way of the transmission shafts and universal joints that have been described and by way of the central gear box 37, the two gear boxes 30 and the two change-speed gears 31. The change-speed gears 31 will previously have been provided with co-operating pairs of pinions appropriate to the nature and condition of the soil that is to be cultivated and the consistency of the soil that is required after treatment. The adjusters that are afforded by the screwthreaded spindle assemblies 22 will also previously have been manipulated to give the required depth of penetration of the tines or other tools of the soil working members 16 into the ground having regard to substantially the same operating factors. Each of the two groups of 18 soil working members 16 works a corresponding broad strip of ground due to the overlapping arrangement of the eighteen soil-working members 16 of each group and, as previously mentioned, the two broad strips of ground overlap, or at least adjoin one another, at the center of the width of the harrow to produce a single very broad strip of worked soil which may conveniently, but by no means essentially, have a width of substantially 9 meters. The harrow is able to match undulations in the surface of the soil that are met with during operation because each of the two frame portions 13 is upwardly and downwardly displaceable relative to the supporting structure or frame 1, independently of the other, as a result of the provision of the corresponding dual parallelogram linkages 14. The hydraulic piston and cylinder assemblies 23 are not subject to pressure during operation and thus do not interfere with upward and downward movements of the corresponding frame portions 13. Excessive downward movements of the frame portions 13 relative to the supporting structure or frame 1 are prevented by the provision of chains or other flexible but inextensible members (not shown) that directly or indirectly interconnect those parts and become taut when the required maximum downward displacement of at least one of the frame portions 13 is reached. Upward movements of the rollers 20 are not prevented by the overlying arms 26 because of the upwardly convex rear curved portions of those arms which register with said rollers 20 when they are moved upwardly. If desired, the outer plate 12 of each dual parallelogram linkage 14 may be connected by a stabilising bar (not shown) to a central region of the supporting structure or frame 1. The provision of the stabilising bars is useful in minimising unwanted movements of the frame portions 13 relative to the structure or frame 1 during the operation of the machine.

Agricultural tools or implements such as the precision seed drills 28 that are illustrated in broken lines may be connected to the tool bars 27 to lie at the rear of the harrow with respect to the direction A so that said tools or implements may operate simultaneously with the harrow. Such tools or implements may move upwardly and downwardly independently of the supporting structure or frame 1 of the harrow itself because of their pivotal connections to that structure or frame by way of the pins 25. When the harrow is in operation, the planes or rotation of the two rear ground wheels 8 with respect to the direction A are retained in the settings illustrated in FIGS. 1 to 4 of the drawings by appropriately disposing the corresponding locking pins 9. The two front ground wheels 8 with respect to the same direction are, however, left to act as free castor wheels. When the rotary harrow is to be brought from the working position thereof that is shown in FIGS. 1 to 4 of the drawings to the inoperative transport position thereof that is shown in FIG. 5, controls of the hydraulic system of the operating tractor or other vehicle are operated to cause the piston rods of the assemblies 23 to be withdrawn upwardly into their cylinders. This raises the two frame portions 13 together with their soil-working members 16 and the two rollers 20. The tines or other tools of the members 16 are then clear of contact with the ground surface. It should, however, be noted that the assemblies 23 may be connected to the controls in such a way that it is possible to raise one frame portion 13 and the corresponding other parts that have just been mentioned while leaving the remaining frame portion 13 and corresponding parts in an operative condition. This can be useful when narrower strips of land require cultivation. The tool bars 27 and any tools or implements that are connected thereto are tilted upwardly about the pivot pins 25 until locking pins 65 that are carried by said tool bars come into register with lugs depending from the tie beams 4. The locking pins 65 are then engaged to retain the tool bars 27 in the raised inoperative positions that can be seen in FIG. 3 of the drawings and in full lines in FIG. 2 thereof. After withdrawing the hitch pin or the like that co-operates with the towing eye 47 of the like, the draw bar 51 can be turned upwardly and rearwardly about the substantially horizontal axis of the pivotal connection of the opposite ends of the beam 44 to two of the lugs 43 at the front of the beam 2. The drawbar 51 will then lie on top of the harrow as shown in FIG. 5 of the drawings. The alternative drawbar 58, which was lying on top of the harrow, as shown in FIG. 1 of the drawings, during the operation of the latter, is then tilted upwardly and forwardly through substantially 180° about the axis embodied in the pivot pins 53 to bring it to its position of use as shown in FIG. 5, the towing eye or the like 57 being coupled to the tow bar at the rear of the tractor or other operating vehicle with the aid of the previously employed hitch pin or the like. The locking pins 9 are disengaged and the planes of rotation of the four ground wheels 8 are turned into the angular settings about the axes of the corresponding shafts 6 that are shown in FIG. 5 of the drawings. The locking pins 9 that correspond to the two rearmost ground wheels 8, with respect to the intended direction of inoperative transport, are then re-engaged to maintain the planes of rotation of those two ground wheels 8 in the positions illustrated. The two leading ground wheels 8 in the position illustrated in FIG. 5 remain as free castor wheels. Thus, although having a working width of the order of 9 meters, the described and illustrated rotary harrow can be brought quickly and easily to an inoperative transport position in which it can be moved along public roads and through gateways and the like without causing any significant hazard.

Although the invention has been described in relation to a rotary harrow which has a total of 36 of the soil working members 16 and thus a working width of substantially 9 meters with the dimensions that have been discussed, it is emphasised again that the invention can be applied with equal usefulness to rotary harrows which comprise greater or smaller numbers of the soil-working members 16 and which, accordingly, are of greater or lesser working widths. In any such case, it is possible to dispose the rotary harrow in an inoperative transport position in which its effective width is little, if any, greater than the path of travel of the tractor or other vehicle which tows it under such conditions. With some auxiliary tools or implements, such as the precision seed drills 28, those tools or implements may be left connected to the tool bars 27 without significantly increasing the transport width of the harrow. There are, however, some tools and implements that would need to be detached from the tool bars 27 for separate transport because of their constructions and/or sizes.

Although certain features of the rotary harrow that have been described and/or that are illustrated in the accompanying drawings will be set forth in the following claims as inventive features, it is emphasised that the invention is not necessarily limited to those features and that it includes within its scope each of the parts of the rotary harrow that has been described, and/or that is illustrated in the accompanying drawings, both individually and in various combinations.

What we claim is:

1. A soil cultivating implement or rotary harrow comprising a frame and at least two separate groups of soil working members supported on respective elongated portions of said frame, said soil working members being rotatably mounted on upwardly extending axes afforded by shafts and said shafts being positioned in a row that extends transverse to the direction of operative travel, each frame portion being hollow and independently pivoted to said frame, said portion being vertically displaceable relative to the remainder of the frame to match ground undulations during operation, said frame portion being at least partly sustained in operative position above the ground by a corresponding supporting roller coupled to that frame portion, at least three ground wheels pivoted to said frame and said ground wheels being positioned to support said frame during operation, driving means connected to a corresponding gear box of each said group and said gear box containing transmission parts that engage the shafts of the soil working members of said group, said frame including a leading beam and rearwardly extending arms being pivotably connected to that beam, tool bar means on the ends of said arms and said tool bar means being positioned to support additional tools at the rear of the rollers.

2. A harrow as claimed in claim 1, wherein each group of soil working members comprises eighteen members and the distance between the axes of rotation of immediately neighboring soil working members of one group is about 25 - 30 cms.

3. A soil cultivating implement or rotary harrow comprising a frame and at least two separate groups of soil working members supported on respective elongated portions of said frame, said soil working members being rotatably mounted on upwardly extending axes afforded by shafts and said shafts being positioned in a row that extends transverse to the direction of operative travel, each frame portion being hollow and independently pivoted to said frame, said portion being vertically displaceably relative to the remainder of the frame to match ground undulations during operation, said frame portion being at least partly sustained in operative position above the ground by a corresponding supporting roller coupled to that frame portion, at least three ground wheels pivoted to said frame and said ground wheels being positioned to support said frame during operation, driving means connected to a corresponding gear box of each said group and said gear box containing transmission parts that engage the shafts of the soil working members of said group, said frame comprising beam means and at least one tool bar being pivoted to a leading beam of said beam means by arms that extend substantially parallel to the direction of travel.

4. A harrow as claimed in claim 3, wherein a corresponding tool bar is provided for each group of soil working members, said tool bar being located directly behind a corresponding roller, when said harrow is viewed in plan, each tool bar having a length substantially equal to the transverse length of the corresponding frame portion.

5. A harrow as claimed in claim 4, wherein said arms are pivotable about substantially horizontal axes and each arm has curved positions between its midpoint and its rearmost end, said curved portions extending upwardly and being located in substantially vertical register with a corresponding underlying roller.

* * * * *